United States Patent
Hwang

(10) Patent No.: US 7,274,532 B2
(45) Date of Patent: Sep. 25, 2007

(54) BASE MEMBER OF DISK DRIVE HAVING CLOCK WINDOW TO WRITE SERVO TRACK INFORMATION

(75) Inventor: Ji-ho Hwang, Yeosu-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 362 days.

(21) Appl. No.: 10/912,161

(22) Filed: Aug. 6, 2004

(65) Prior Publication Data

US 2005/0046998 A1 Mar. 3, 2005

(30) Foreign Application Priority Data

Aug. 25, 2003 (KR) .................. 10-2003-0058780

(51) Int. Cl.
*G11B 33/14* (2006.01)
*G11B 33/08* (2006.01)

(52) U.S. Cl. .................. 360/97.01; 360/97.02; 360/97.03

(58) Field of Classification Search ............. 360/97.01, 360/97.02, 97.03, 97.04, 98.01, 137, 900, 360/901, 77.08, 78.14, 48
See application file for complete search history.

(56) References Cited

U.S. PATENT DOCUMENTS

| | | | | |
|---|---|---|---|---|
| 5,446,609 A | * | 8/1995 | Thanos et al. | 360/97.02 |
| 5,598,306 A | * | 1/1997 | Frees et al. | 360/97.02 |
| 5,910,862 A | * | 6/1999 | Ogawa et al. | 360/97.01 |
| 6,008,966 A | * | 12/1999 | Forbord et al. | 360/97.03 |
| 6,118,604 A | * | 9/2000 | Duffy | 360/48 |
| 6,373,654 B1 | * | 4/2002 | Iwahara et al. | 360/97.01 |
| 6,456,453 B1 | * | 9/2002 | Wauke et al. | 360/97.02 |
| 6,657,812 B2 | * | 12/2003 | Serizawa et al. | 360/97.02 |
| 6,674,609 B2 | * | 1/2004 | Boutaghou | 360/97.02 |
| 6,724,562 B1 | * | 4/2004 | Ang et al. | 360/78.04 |
| 6,900,962 B1 | * | 5/2005 | Forbord | 360/97.02 |
| 2003/0039055 A1 | * | 2/2003 | Runyon et al. | 360/78.11 |
| 2005/0174682 A1 | * | 8/2005 | Yoo | 360/97.01 |
| 2006/0103974 A1 | * | 5/2006 | Hwang | 360/97.01 |

FOREIGN PATENT DOCUMENTS

| | | |
|---|---|---|
| JP | 07-220423 | 8/1995 |
| JP | 07220423 A * | 8/1995 |
| JP | 2004111037 A * | 4/2004 |

OTHER PUBLICATIONS

Korean Office Action for Application No. 10-2003-0058780.

* cited by examiner

*Primary Examiner*—Andrea Wellington
*Assistant Examiner*—Matthew G. Kayrish
(74) *Attorney, Agent, or Firm*—Staas & Halsey LLP

(57) ABSTRACT

A base member of a disk drive having a bottom plate, on which a spindle motor to rotate a disk is mounted, and a side wall positioned along an edge of the bottom plate. The base member has a clock window positioned on the side wall, through which a clock head to write servo track information on the disk is inserted in the disk drive, and a concave adjacent to the clock window and having a predetermined depth relative to an upper surface of the bottom plate, to accommodate the clock head inserted through the clock window.

18 Claims, 6 Drawing Sheets

BASE MEMBER OF DISK DRIVE HAVING CLOCK WINDOW TO WRITE SERVO TRACK INFORMATION

CROSS-REFERENCE TO RELATED APPLICATIONS

This application claims the priority of Korean Patent Application No. 2003-58780, filed on Aug. 25, 2003, in the Korean Intellectual Property Office, the disclosure of which is incorporated herein in its entirety by reference.

BACKGROUND OF THE INVENTION

1. Field of the Invention

The present invention relates to a disk drive, and more particularly, to a base member of a disk drive having a clock window to insert a clock head to write servo track information on a disk in the disk drive.

2. Description of the Related Art

Hard disk drives (HDDs), which are data storage devices used for computers, use read/write heads to reproduce and record data with respect to a disk. In the HDD, the read/write head performs its functions while being moved by an actuator to a desired position in a state of being lifted to a predetermined height from a recording surface of a rotating disk.

FIG. 1 is an exploded perspective view illustrating the configuration of a conventional hard disk drive. FIG. 2 is a perspective view illustrating a state in which a clock head is inserted in the hard disk drive of FIG. 1. FIG. 3 is a vertical sectional view illustrating a hard disk drive taken along line A-A' shown in FIG. 2.

Referring to FIGS. 1 through 3, a spindle motor 30 to rotate a disk 20 and an actuator 40 to move the read/write head to reproduce and record data to a desired position on the disk 20 are installed on a base member 11 of a hard disk drive.

The actuator 40 includes: a swing arm 42 rotatably coupled to a pivot bearing 41 installed on the base member 11; a suspension 43 installed at one end portion of the swing arm 42 and supporting a slider, on which the read/write head is mounted, elastically biased toward a surface of the disk 20; and a voice coil motor (VCM) 45 to rotate the swing arm 42. The voice coil motor 45 is controlled by a servo control system, and rotates the swing arm 42 in a direction according to Fleming's left hand rule by the interaction between current applied to the VCM coil (not shown) and a magnetic field formed by a magnet (not shown). That is, when the power of the hard disk drive is turned on and the disk 20 starts to rotate, the voice coil motor 45 rotates the swing arm 42 counterclockwise to move the read/write head above a recording surface of the disk 20. In contrast, when the power of the disk drive is turned off and the disk 20 stops rotation, the voice coil motor 45 rotates the swing arm 42 clockwise, so that the read/write head is moved away from the recording surface of the disk 20.

A cover member 12 is assembled to the upper portion of the base member 11 using a plurality of screws 19. The cover member 12 protects the disk 20 and the actuator 40 by encompassing the same, and prevents intrusion of dust and humidity into the disk drive.

A circulation filter 50 to filter particles inside the disk drive, is provided at a corner of the base member 11.

In the disk drive having the above configuration, servo track information is written on the surface of the disk 20 for the read/write head to rapidly and accurately access a predetermined position on the disk 20, which is referred to as servo track write (STW). For the STW, a clock window 60 that is a through hole, is positioned at a side wall of the base member 11. A clock head 70 is inserted into the disk drive through the clock window 60 to write servo information on the disk 20. When the STW is completed, the clock head 70 is removed from the clock window 60 and the clock window 60 is sealed with a sealing tape 80 so that intrusion of dust and humidity into the disk drive is prevented.

But with a trend towards a more compact disk drive, the height of the disk drive decreases so that the height of the base member 11 decreases. Accordingly, the size of the clock window 60 which must still accommodate the clock head 70, is relatively larger compared to the more compact base member 11. Thus, a space to attach the sealing tape 80 on the side surface of the base member 11 is reduced, so that the sealing tape attachment area is obtained by cutting part of the edge of the cover member 12. But such cutting of part of the cover member 12 deteriorates the rigidity of the cover member 12.

To solve the above problem, as is shown in FIG. 4, instead of positioning the clock window on the base member 11, the clock head 70 is disposed above the disk 20 to write servo information on an upper surface of the disk 20 prior to the cover member 12 being attached to the base member 11. But in this case, since dynamic characteristics of the disk drive change before and after the cover member 12 is attached, the quality of the STW may deteriorate. Furthermore, when the STW needs to be performed again, the cover member 12 must be removed, which lowers work efficiency.

In another conventional STW method, servo information is written on a disk at a different place, and then the disk is assembled to the spindle motor. But in this case, to perform STW again, complicated steps are required, such that a cover member is opened, the disk is separated from the spindle motor, servo information is written on the disk, and then the disk and the cover member are re-assembled. Thus, this method is disadvantageous, in that the STW quality deteriorates due to a change in the dynamic characteristic of the disk drive, and the work efficiency is lowered.

Japanese Patent Application Publication No. 7-220423 discloses a base member with a clock window that is punched. The clock window is positioned on a bottom plate of the base member toward a side wall. The clock window is sealed with a cover manufactured of plastic resin after the STW is performed. According to this configuration, however, since the clock window is positioned on the bottom plate of the base member by penetrating the same, the rigidity of the base member is reduced. Furthermore, such a configuration is difficult to be applied to a thin base member corresponding to the recent trend towards the more compact disk drive.

SUMMARY OF THE INVENTION

To solve the above and/or other problems, the present invention provides a base member of a disk drive having a clock window, in which a clock head for servo track write is inserted, positioned on a side wall thereof, which can maintain rigidity and secure a sealing tape attachment area.

According to an aspect of the present invention, a base member of a disk drive has a bottom plate on which a spindle motor to rotate a disk is mounted, and a side wall positioned along an edge of the bottom plate. The base member also comprises: a clock window positioned on the side wall, through which a clock head to write servo track information on the disk is inserted in the disk drive; and a concave, adjacent to the clock window, and having a predetermined depth relative to an upper surface of the bottom plate, to accommodate the clock head inserted through the clock window.

According to one aspect, a bottom surface of the clock window and a bottom surface of the concave form the same plane.

According to one aspect, the predetermined depth of the concave is smaller than the thickness of the bottom plate.

According to one aspect, the base member further comprises a reinforcement portion to reinforce the thickness of the bottom plate, positioned at an exterior portion of the bottom plate corresponding to the concave. According to one aspect, a thickness of the reinforcement portion is substantially the same as the predetermined depth of the concave.

According to one aspect, the predetermined depth of the concave is greater than the thickness of the bottom plate.

According to one aspect, a thickness of a portion of the bottom plate encompassing the concave and a thickness of a portion of the bottom plate adjacent the concave are substantially the same.

Additional aspects and/or advantages of the invention will be set forth in part in the description which follows, and in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
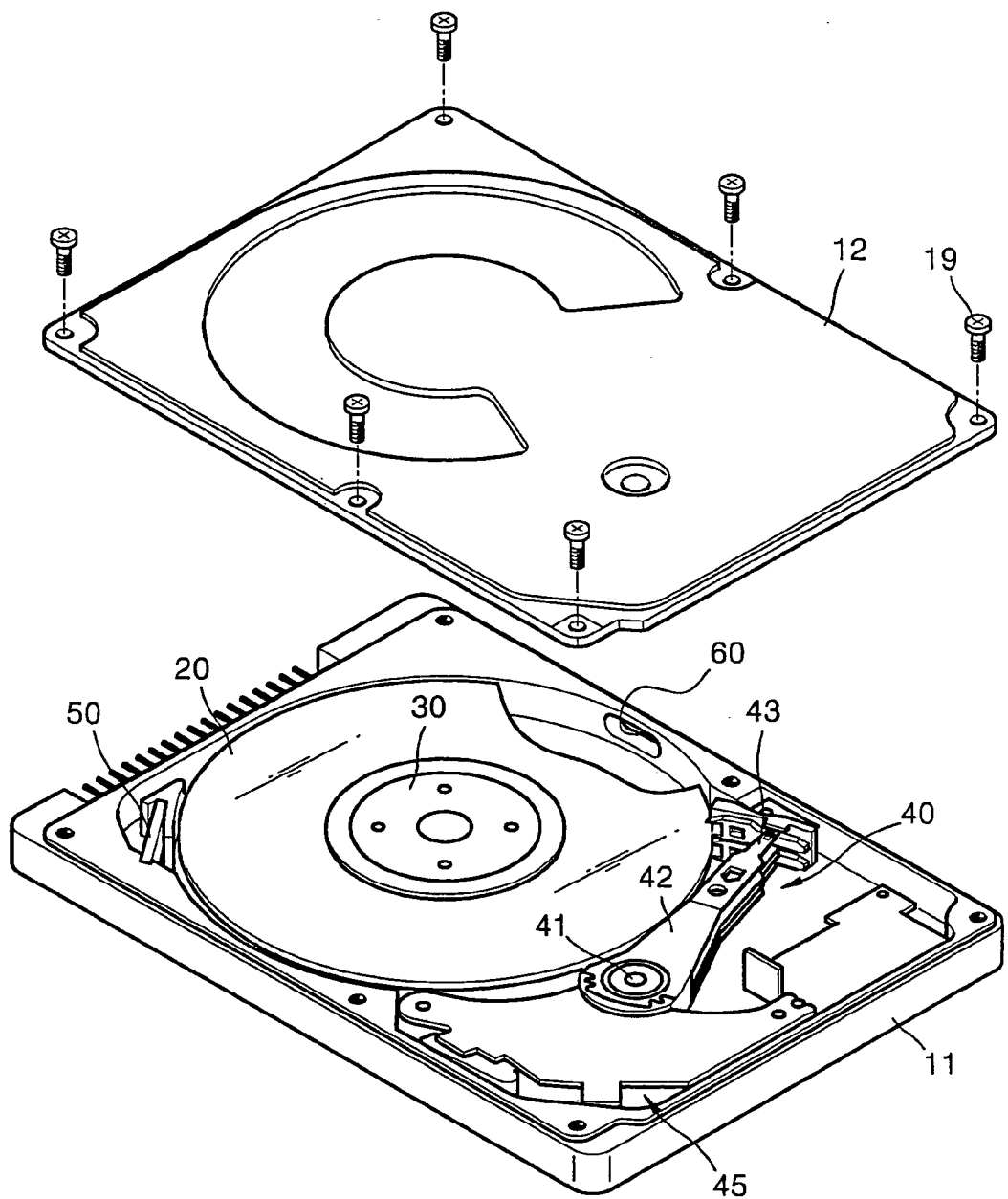
FIG. 1 is an exploded perspective view illustrating a configuration of a conventional hard disk drive.
Figure 2:
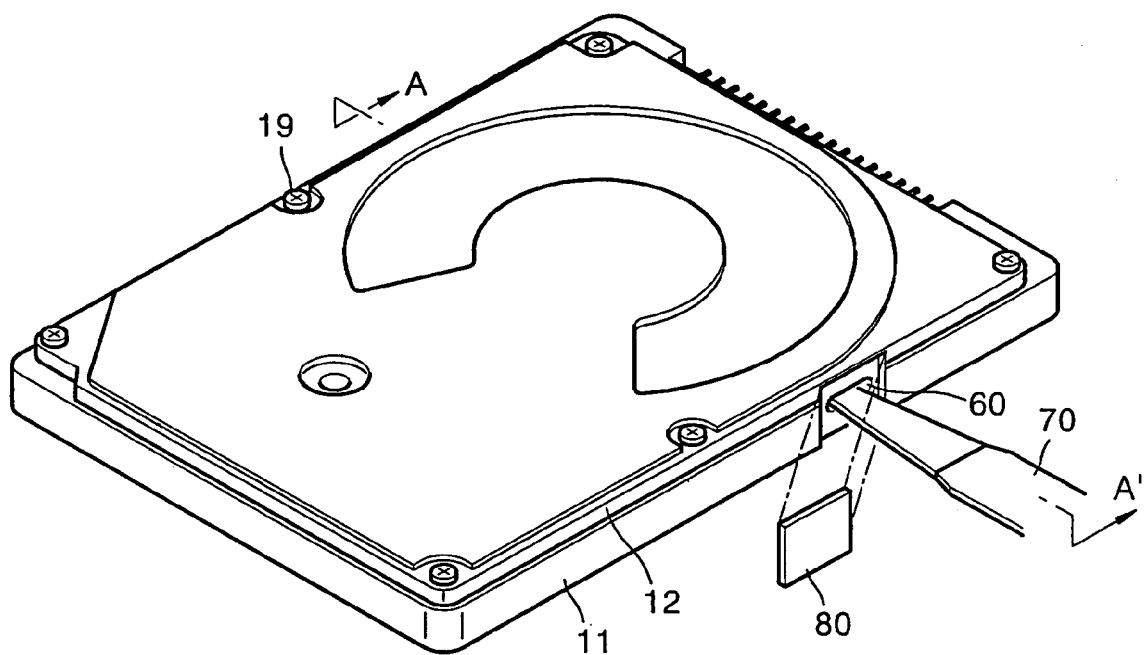
FIG. 2 is a perspective view illustrating a state in which a clock head is inserted in the hard disk drive of FIG. 1.
Figure 3:
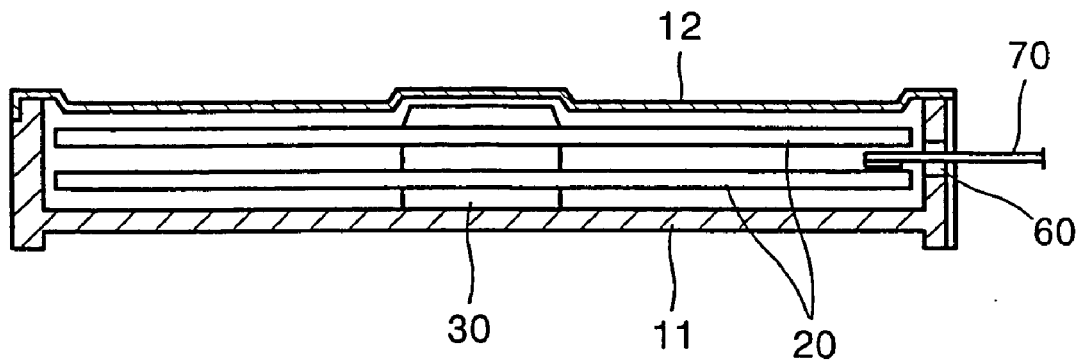
FIG. 3 is a vertical sectional view illustrating a hard disk drive taken along line A-A' shown in FIG. 2.
Figure 4:
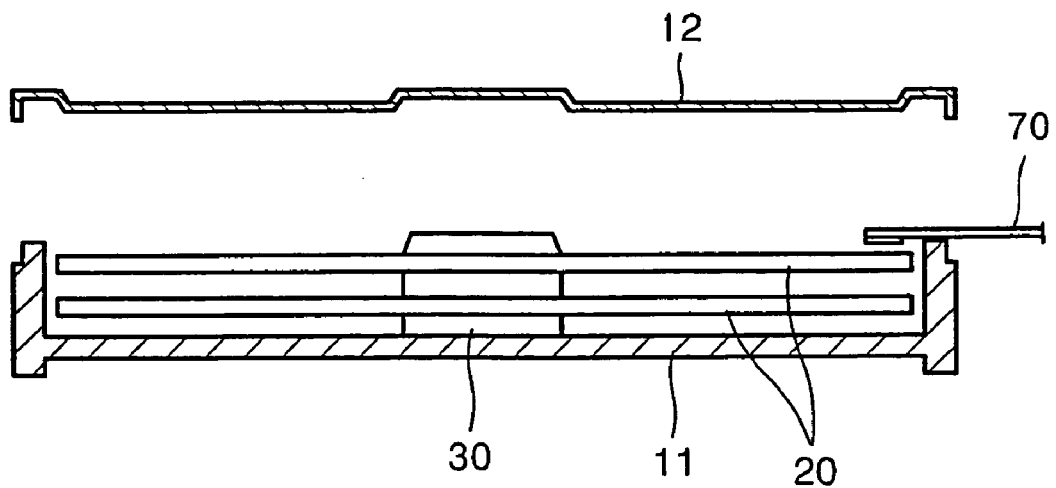
FIG. 4 is a vertical sectional view illustrating a hard disk drive to explain another method of writing a servo signal.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 5:
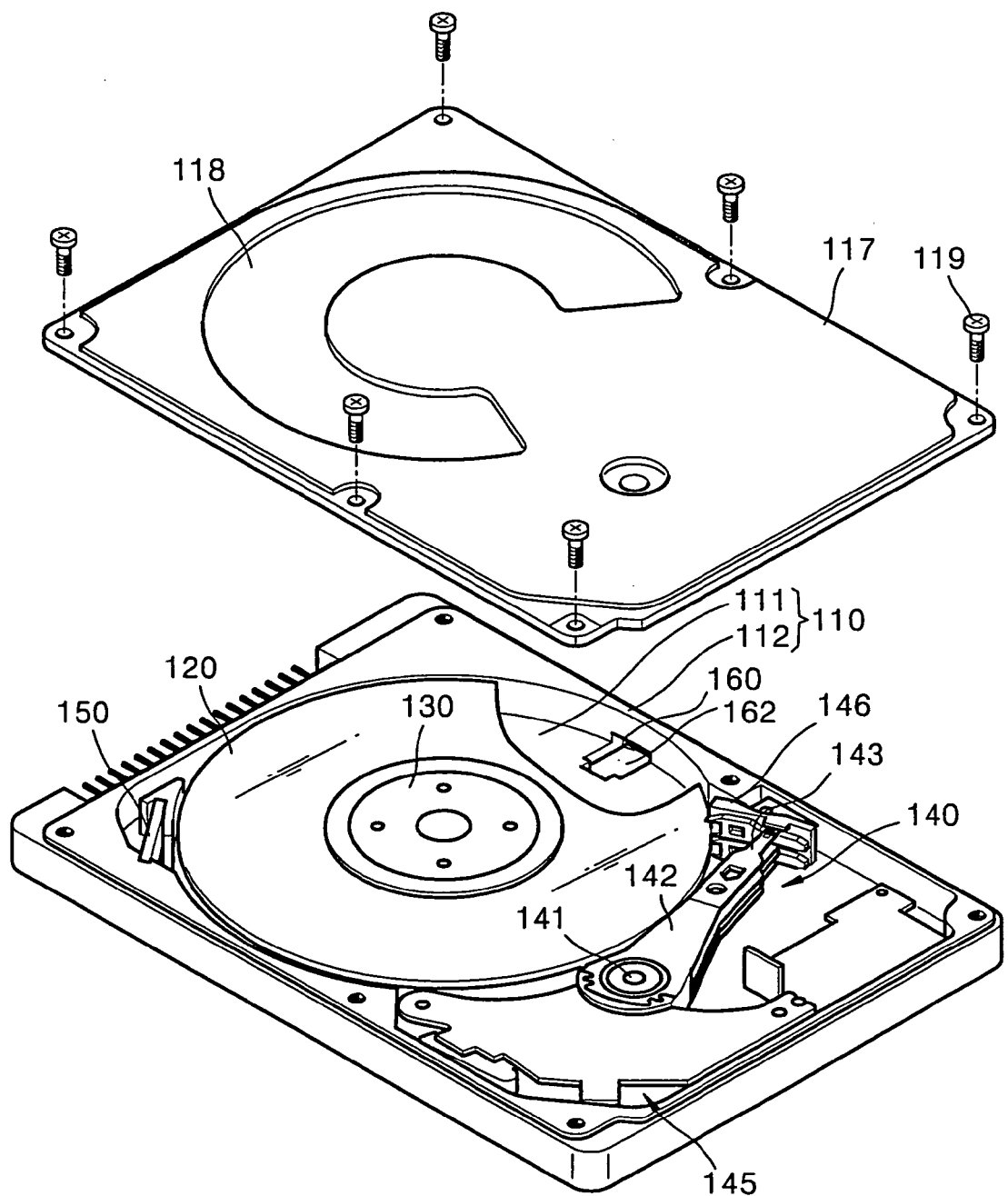
FIG. 5 is an exploded perspective view illustrating a disk drive having a base member, where a clock window is positioned, according to a first embodiment of the present invention.
Figure 6:
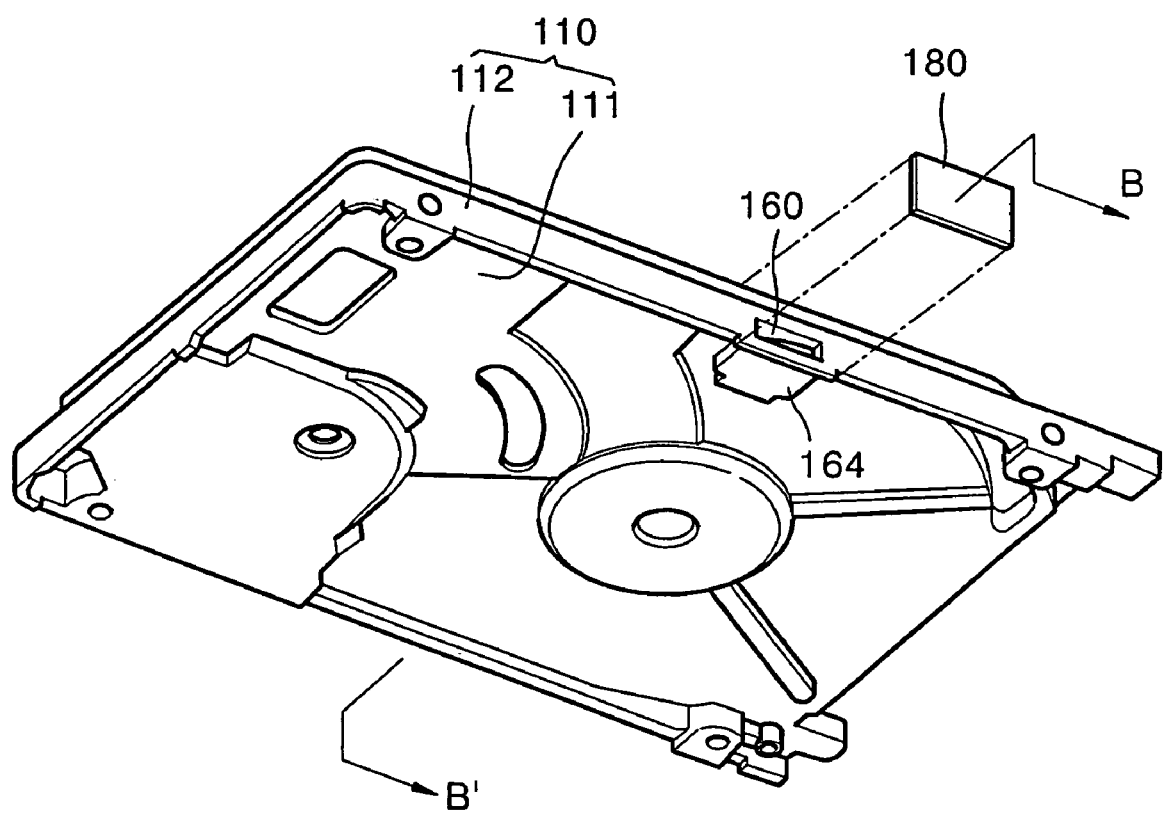
FIG. 6 is a perspective view illustrating the base member of FIG. 5.
Figure 7:
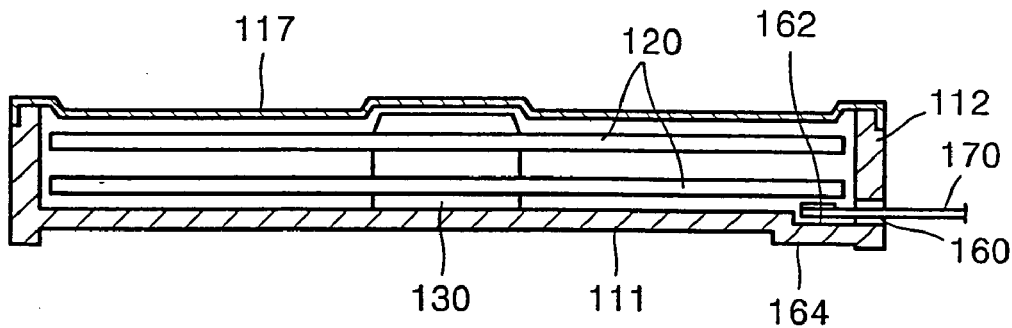
FIG. 7 is a vertical sectional view illustrating the hard disk drive taken along line B-B' shown in FIG. 6.

Referring to FIGS. 5 and 7, a disk drive to reproduce and record data with respect to a disk 120 according to a first embodiment of the present invention, includes a base member 110, a cover member 117, a spindle motor 130 to rotate the disk 120, and an actuator 140.

According to one aspect, the base member 110 is manufactured of aluminum or aluminum alloy by die-casting. The base member 110 includes a bottom plate 111 and a side wall 112 formed along the edge of the bottom plate 110. A clock window 160, through which a clock head 170 to write servo track information on the disk 120 is inserted into the disk drive, is provided on the base member 110, which will be described later.

According to one aspect, a circulation filter 150 to filter particles included in air flowing inside the disk drive is provided at a corner of the base member 110.

The spindle motor 130 is installed on the bottom plate 111 of the base member 110. At least one disk 120 is installed on a hub of the spindle motor 130, and the disk 120 is rotated together with the hub.

The actuator 140 which moves a read/write head to record and reproduce data to a desired position on the disk 120, includes a swing arm 142, a suspension 143, and a voice coil motor 145. The swing arm 142 is rotatably coupled to a pivot bearing 141 installed on the bottom plate 111 of the base member 110. The suspension 143 is coupled to a leading end portion of the swing arm 142 and supports a slider, on which the read/write head is mounted, elastically biased toward a surface of the disk 120.

The voice coil motor (VCM) 145, which provides a drive force to rotate the swing arm 142, is controlled by a servo control system, and rotates the swing arm 142 in a direction according to Fleming's left hand rule by the interaction between current applied to the a VCM coil (not shown) and a magnetic field formed by a magnet (not shown). That is, when the power of the hard disk drive is turned on and the disk 120 starts to rotate, the voice coil motor 145 rotates the swing arm 142 counterclockwise to move the read/write head above a recording surface of the disk 120. In contrast, when the power of the disk drive is turned off and the disk 120 stops rotation, the voice coil motor 145 rotates the swing arm 142 clockwise so that the read/write head is moved away from the recording surface of the disk 120. The read/write head, when moved away from the recording surface of the disk 120, is parked on a ramp 146 provided outside the disk 120.

The cover member 117 is assembled to the upper portion of the base member 110 using a plurality of screws 119. The cover member 117 protects the disk 120, the spindle motor 130, and the actuator 140 by encompassing the same, and prevents intrusion of dust and humidity into the disk drive. According to one aspect, the cover member 117 is manufactured of a stainless steel plate by a press process. According to one aspect, a groove 118, to reduce vibrations of the disk 120 by decreasing an interval between the disk 120 and the cover member 117, is positioned on the cover member 117.

In the present embodiment, the clock window 160 is positioned at the side wall 112 of the base member 110. In detail, according to one aspect, the clock window 160 has a rectangular shape having a height and width such that the clock head 170 can freely move in and out, and is created by penetrating the side wall 112. The clock window 160 is positioned such that a center of the clock window 160 lies approximately on a plane defined by an extended surface of an upper surface of the bottom plate 111, that is, a position close to a lower end portion of the side wall 112.

The upper surface of the bottom plate 111 of the base member 110 has a concave 162 adjacent to the clock window 160. The concave 162 is formed to a predetermined depth to accommodate the clock head 170 inserted through the clock window 160. According to one aspect, the concave 162 is formed such that a bottom surface of the clock window 160 lies in a plane defined by the concave 162. In other words, the bottom surface of the clock window 160 horizontally extends to the bottom plate 111 to form the bottom surface of the concave 162. Thus, the clock head 170 can be inserted in the disk drive through the clock window 160 without interference.

In the clock window 160 and the concave 162 having the above configurations, the clock head 170 is inserted in the disk drive through the clock window 160 and accommodated in the concave 162. The clock head 170 in this state writes servo track information on a bottom surface of the disk 120. When the writing of the servo track information is completed, the clock head 170 is removed from the clock window 160, and the clock window 160 is sealed with a sealing tape 180 so that the intrusion of dust and humidity into the disk drive is prevented. According to one aspect, since the clock window 160 is positioned close to the lower end portion of the side wall 112 of the base member 110, a sufficient area to attach the sealing tape 180 is available on the outer surface of the side wall 112 of the base member 110, without cutting part of the cover member 117. According to one aspect, an aluminum tape is used as the sealing tape 180. The aluminum tape blocks external electromagnetic waves from transmitting into the disk drive through the clock window 160.

A depth of the concave 162 to accommodate the clock head 170 is determined by an interval between the upper surface of the bottom plate 111 of the base member 110 and the disk 120, and a height of the clock head 170. When the interval between the upper surface of the bottom plate 111 and the disk 120 is relatively small, since the height of the clock head 170 is constant, the depth of the concave 162 increases.

When the thickness of the bottom plate 111 is relatively large, the depth of the concave 162 may be smaller than the thickness of the bottom plate 111. However, since the bottom plate 111 at a portion where the concave 162 is formed becomes thin, rigidity of the base member 110 may deteriorate. Thus, according to one aspect, a reinforcement portion 164 to reinforce the thickness of the bottom plate 111 is formed at a position of a rear surface of the bottom plate 111 corresponding to the concave 162. According to one aspect, a height of the reinforcement portion 164 is substantially the same as depth of the concave 162. Accordingly, the thickness of a portion of the bottom plate 111 where the concave 162 is formed is the same as that of other portions of the bottom plate 111, and thus deterioration of the rigidity of the base member 111 is prevented.

In the base member 110 having the above configuration, the clock window 160 can be formed at the side wall 112 without deterioration of the rigidity and the clock window 160 can be sealed by using the sealing tape 180. Thus, without disassembling the cover member 117, servo track write (STW) and rewriting the servo track are easily performed.

Figure 8:
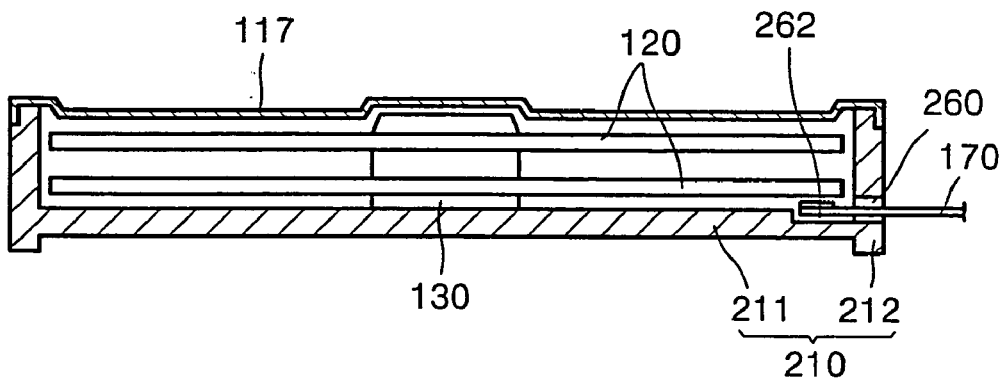
FIG. 8 is a vertical sectional view illustrating a disk drive having a base member, where a clock window is positioned, according to a second embodiment of the present invention.

FIG. 8 shows a base member according to a second embodiment of the present invention. Referring to FIG. 8, a base member 210, according to the second embodiment, includes a bottom plate 211 and a side wall 212 formed along an edge of the bottom plate 211. A clock window 260, through which the clock head 170 to write servo track information on the disk 120 is inserted in the disk drive, is positioned at the side wall 212 of the base member 210. A concave 262 to accommodate the clock head 170 inserted through the clock window 260 is formed on an upper surface of the bottom plate 211, to a predetermined depth, adjacent to the clock window 260. Since the configurations and effects of the clock window 260 and the concave 262 are the same as those described in the first preferred embodiment, detailed descriptions thereof are omitted herein.

According to one aspect, the base member 210 according to the second embodiment is applied to a case in which a thickness of the bottom plate 211 is sufficiently larger than the depth of the concave 262. In this case, although the concave 262 is formed, since a portion of the bottom plate 211 where the concave 262 is formed is sufficiently thick, rigidity of the base member 210 is not deteriorated even if the reinforcement portion 164 of FIG. 7 in the first embodiment is not formed at the rear surface of the bottom plate 211.

Figure 9:
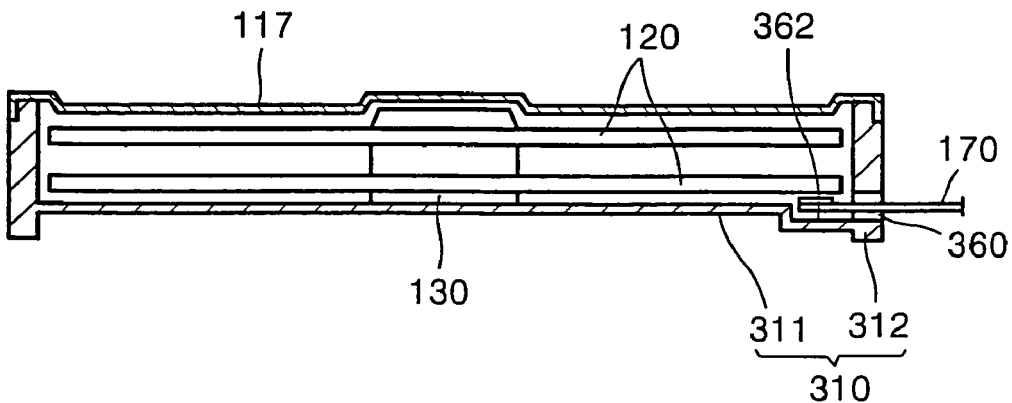
FIG. 9 is a vertical sectional view illustrating a disk drive having a base member, where a clock window is positioned, according to a third embodiment of the present invention.

FIG. 9 shows a base member 310 according to a third embodiment of the present invention, with a clock window. Referring to FIG. 9, the base member 310, according to the third embodiment, includes a bottom plate 311 and a side wall 312. A clock window 360, through which the clock head 170 is inserted, is formed at the side wall 312 of the base member 310. A concave 362, adjacent to the clock window 360 and having a predetermined depth, is formed on an upper surface of the bottom plate 311. Since the configurations and effects of the clock window 360 and the concave 362 are the same as those described in the first preferred embodiment, detailed descriptions thereof are omitted herein.

According to one aspect, the base member 310 according to the third embodiment is applied to a case in which the depth of the concave 362 to accommodate the clock head 170 is greater than a thickness of the bottom plate 311. That is, the base member 310 of the third embodiment can be applied to a compact disk drive which is relatively thin. In this case, the concave 362 may have a box-shape, and the side and bottom surfaces of the concave 362 are limited by the bottom plate 311 having a uniform thickness. That is, the thickness of a portion of the bottom plate 311 encompassing the concave 362 and the thickness of a portion of the bottom plate 311 around the concave 362 are substantially the same. Thus, a sufficient rigidity of the base member 310 at a portion where the concave 362 is formed can be maintained.

As is described above, according to the present invention, the clock window can be positioned at the side wall of the base member of the disk drive without deteriorating the rigidity of the base member. Thus, the rigidity of the base member is maintained, and the servo track write and rewriting of the servo track are easy. Also, since a sufficient sealing tape attachment area is secured at the outer surface of the side wall of the base member without cutting part of the cover member, the rigidity of the cover member is not deteriorated. In addition, since embodiments of the present invention can be easily applied to a relatively thin base member, miniaturization of a disk drive incorporating an embodiment of the present invention is possible.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A base member of a disk drive, having a bottom plate on which a spindle motor to rotate a disk is mounted and a side wall positioned along an edge of the bottom plate, the base member comprising:
   a clock window positioned on the side wall, through which a clock head to write servo track information on the disk is inserted in the disk drive; and
   a concave portion, adjacent to the clock window, and having a predetermined depth relative to an upper surface of the bottom plate, to accommodate the clock head inserted through the clock window,
   wherein the predetermined depth of the concave portion is smaller than the thickness of the bottom plate.

2. The base member as claimed in claim 1, wherein a bottom surface of the clock window and a bottom surface of the concave portion form the same plane.

3. The base member as claimed in claim 1, further comprising:
   a reinforcement portion to reinforce the thickness of the bottom plate, positioned at an exterior portion of the bottom plate corresponding to the concave portion.

4. The base member as claimed in claim 3, wherein a thickness of the reinforcement portion is substantially the same as the predetermined depth of the concave portion.

5. The base member as claimed in claim 1, wherein the predetermined depth of the concave portion is greater than the thickness of the bottom plate.

6. The base member as claimed in claim 5, wherein a thickness of a portion of the bottom plate encompassing the concave portion and a thickness of a portion of the bottom plate adjacent the concave portion are substantially the same.

7. A base member of a hard disk drive, comprising:
   a plate, with which a spindle motor to rotate a disk is connected, having a depression recessed from a first surface of the plate; and
   a side wall adjacent to the plate, having a clock window positioned adjacent to the depression to receive a clock head to write servo track information on the disk,
   wherein a distance the depression is recessed from the first surface of the plate is less than a thickness of the plate.

8. The base member according to claim 7, wherein:
   a thickness of the plate corresponding to the depression is less than a thickness of the plate corresponding to a portion other than the depression; and
   the thickness of the plate corresponding to the depression is sufficiently thick that a rigidity of the base member is not degraded.

9. The base member according to claim 7, wherein the plate comprises:
   a reinforcement portion positioned to correspond to the depression, to reinforce the plate.

10. The base member according to claim 9, wherein a thickness of the reinforcement portion is approximately equal to the distance the depression is recessed from the first surface of the plate.

11. The base member according to claim 9, wherein a thickness of the reinforcement portion is approximately equal to the thickness of the plate.

12. A base member of a hard disk drive, comprising:
   a plate, with which a spindle motor to rotate a disk is connected, having a depression recessed from a first surface of the plate; and
   a side wall adjacent to the plate, having a clock window positioned adjacent to the depression to receive a clock head to write servo track information on the disk,
   wherein the clock window is positioned such that a center of the clock window lies approximately on a plane defined by the first surface of the plate.

13. The base member according to claim 12, wherein the side wall is sized such that an area of the side wall adjacent the clock window is sufficient to secure attachment of a sealing tape over the clock window.

14. The base member according to claim 12, wherein the clock window is positioned such that an area of the side wall adjacent the clock window is sufficient to secure attachment of a sealing tape over the clock window.

15. A base member of a hard disk drive, comprising:
   a plate, with which a spindle motor to rotate a disk is connected, having a depression recessed from a first surface of the plate; and
   a side wall adjacent to the plate, having a clock window positioned adjacent to the depression to receive a clock head to write servo track information on the disk,
   wherein a distance the depression is recessed from the first surface of the plate is greater than a thickness of the plate.

16. The base member according to claim 15, wherein a thickness of the plate corresponding to the depression is approximately equal to a thickness of the plate corresponding to a portion other than the depression, such that a rigidity of the base member is not degraded.

17. A base member of a hard disk drive, comprising:
   a plate, with which a spindle motor to rotate a disk is connected, having a depression recessed from a first surface of the plate; and
   a side wall adjacent to the plate, having a clock window positioned adjacent to the depression to receive a clock head to write servo track information on the disk,
   wherein a first surface of the clock window is approximately co-planar with a first surface of the depression, the first surface of the depression being approximately parallel with the first surface of the plate.

18. A base member of a hard disk drive, comprising:
   a plate, with which a spindle motor to rotate a disk is connected, having a depression recessed from a first surface of the plate; and
   a side wall adjacent to the plate, having a clock window positioned adjacent to the depression to receive a clock head to write servo track information on the disk,
   wherein a distance the depression is recessed from the first surface of the plate is determined by a distance between the first surface of the plate and the disk, and a dimension of the clock head in a direction approximately perpendicular to the first surface of the plate, such that the clock head is insertable through the clock window, into the depression, to write servo track information on the disk.

* * * * *